United States Patent
Hutchison et al.

(10) Patent No.: US 9,403,231 B2
(45) Date of Patent: Aug. 2, 2016

(54) HYBRID PULSED-SHORT CIRCUIT WELDING REGIME

(71) Applicant: Illinois Tool Works Inc., Glenview, IL (US)

(72) Inventors: Richard Martin Hutchison, Iola, WI (US); James Lee Eucker, Appleton, WI (US); Todd Earl Holverson, Appleton, WI (US); Bryan Dustin Marschke, Kimberly, WI (US); Robert R. Davidson, New London, WI (US); Richard Schuh, Freedom, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 492 days.

(21) Appl. No.: 13/655,174

(22) Filed: Oct. 18, 2012

(65) Prior Publication Data

US 2013/0112676 A1  May 9, 2013

Related U.S. Application Data

(60) Provisional application No. 61/557,817, filed on Nov. 9, 2011.

(51) Int. Cl.
*B23K 9/09* (2006.01)

(52) U.S. Cl.
CPC .. *B23K 9/09* (2013.01); *B23K 9/092* (2013.01)

(58) Field of Classification Search
USPC ............ 219/130.21, 130.31, 130.32, 130.33, 219/130.51
See application file for complete search history.

(56) References Cited

U.S. PATENT DOCUMENTS

| | | | | |
|---|---|---|---|---|
| 5,844,193 A | * | 12/1998 | Nomura et al. | 219/110 |
| 6,204,476 B1 | * | 3/2001 | Reynolds et al. | 219/130.51 |
| 2005/0184039 A1 | * | 8/2005 | Stava | 219/130.51 |

FOREIGN PATENT DOCUMENTS

| | | |
|---|---|---|
| CN | 1600486 | 3/2005 |
| CN | 1871093 | 11/2006 |
| CN | 101062530 | 10/2007 |
| JP | 3285768 A | 12/1991 |
| JP | H03285768 | 12/1991 |
| JP | H06277840 | 10/1994 |

OTHER PUBLICATIONS

PCT International Search Report & Written Opinion of PCT/US2012/063783 dated Mar. 1, 2013, 12 pages.

* cited by examiner

*Primary Examiner* — Brian Jennison
(74) *Attorney, Agent, or Firm* — Fletcher Yoder P.C.

(57) ABSTRACT

Welding power is generated by first generating two different current waveforms, and comparing the waveform values for control intervals to select which waveform provides the greater current. The waveforms are for different transfer modes, such as one for a pulsed arc portion, and another for a short-circuit transfer mode or for short-circuit clearing. The waveforms may be programmed by settings in a state machine. A balance or relative prioritization in the comparison may be influenced by user inputs. The resulting hybrid process has aspects of both spray transfer and short-circuit transfer modes.

22 Claims, 4 Drawing Sheets

HYBRID PULSED-SHORT CIRCUIT WELDING REGIME

CROSS REFERENCE TO RELATED APPLICATIONS

This application is a Non provisional Patent Application of U.S. Provisional Patent Application No. 61/557,817, entitled "Hybrid Pulsed-Short Circuit Welding Regime", filed Nov. 9, 2011, which is herein incorporated by reference.

BACKGROUND

The invention relates generally to welders, and more particularly to a welder configured to perform a welding operation in which a pulsed waveform is applied to welding wire as the wire is advanced from a welding torch.

A wide range of welding systems and welding control regimes have been implemented for various purposes. In continuous welding operations, metal inert gas (MIG) techniques allow for formation of a continuing weld bead by feeding welding wire shielded by inert gas from a welding torch. Electrical power is applied to the welding wire and a circuit is completed through the workpiece to sustain an arc that melts the wire and the workpiece to form the desired weld.

Advanced forms of MIG welding are based upon generation of pulsed power in the welding power supply. That is, various pulsed regimes may be carried out in which current and/or voltage pulses are commanded by the power supply control circuitry to regulate the formation and deposition of metal droplets from the welding wire, to sustain a desired heating and cooling profile of the weld pool, to control shorting between the wire and the weld pool, and so forth.

While very effective in many applications, such pulsed regimes may be subject to drawbacks. For example, depending upon the transfer mode, the processes may either limit travel speed, create excessive spatter (requiring timely cleanup of welded workpieces), provide less than optimal penetration, or any combination of these and other effects. Moreover, certain pulsed processes, such as ones operating in a spray mode of material transfer, may run excessively hot for particular applications. Others, such as short circuit processes, may run cooler, but may again produce spatter and other unwanted weld effects.

There is a need, therefore, for improved welding strategies that allow for welding in pulsed waveform regimes while improving weld quality and flexibility.

BRIEF DESCRIPTION

The present invention provides welding systems designed to respond to such needs. In accordance with an exemplary implementation, a welding system comprises a first waveform generator configured to generate a first waveform for welding current for a first transfer mode, and a second waveform generator configured to generate a first waveform for welding current for a second transfer mode. A comparison component is configured to compare values of the first and second waveforms, and processing circuitry is configured to provide a control waveform based upon the comparison. Power conversion circuitry provides welding power output based upon the control waveform.

In accordance with another aspect, a welding system comprises a first waveform generator configured to generate a pulsed arc waveform for welding current, and a second waveform generator configured to generate a short-clearing waveform for welding current. A comparison component compares values of the pulsed arc and short-clearing waveforms, and processing circuitry provides a control waveform based upon the comparison. Power conversion circuitry then provides welding power output based upon the control waveform.

The invention also provides methods for welding, such as, in accordance with one aspect, comprise generating a first waveform for welding current for a first transfer mode, and generating a second waveform for welding current for a second transfer mode. Values of the first and second waveforms for control intervals are compared, and a control waveform is generated based upon the comparison. Incoming power is then converted to welding power based upon the control waveform.

DRAWINGS

DETAILED DESCRIPTION

Figure 1:
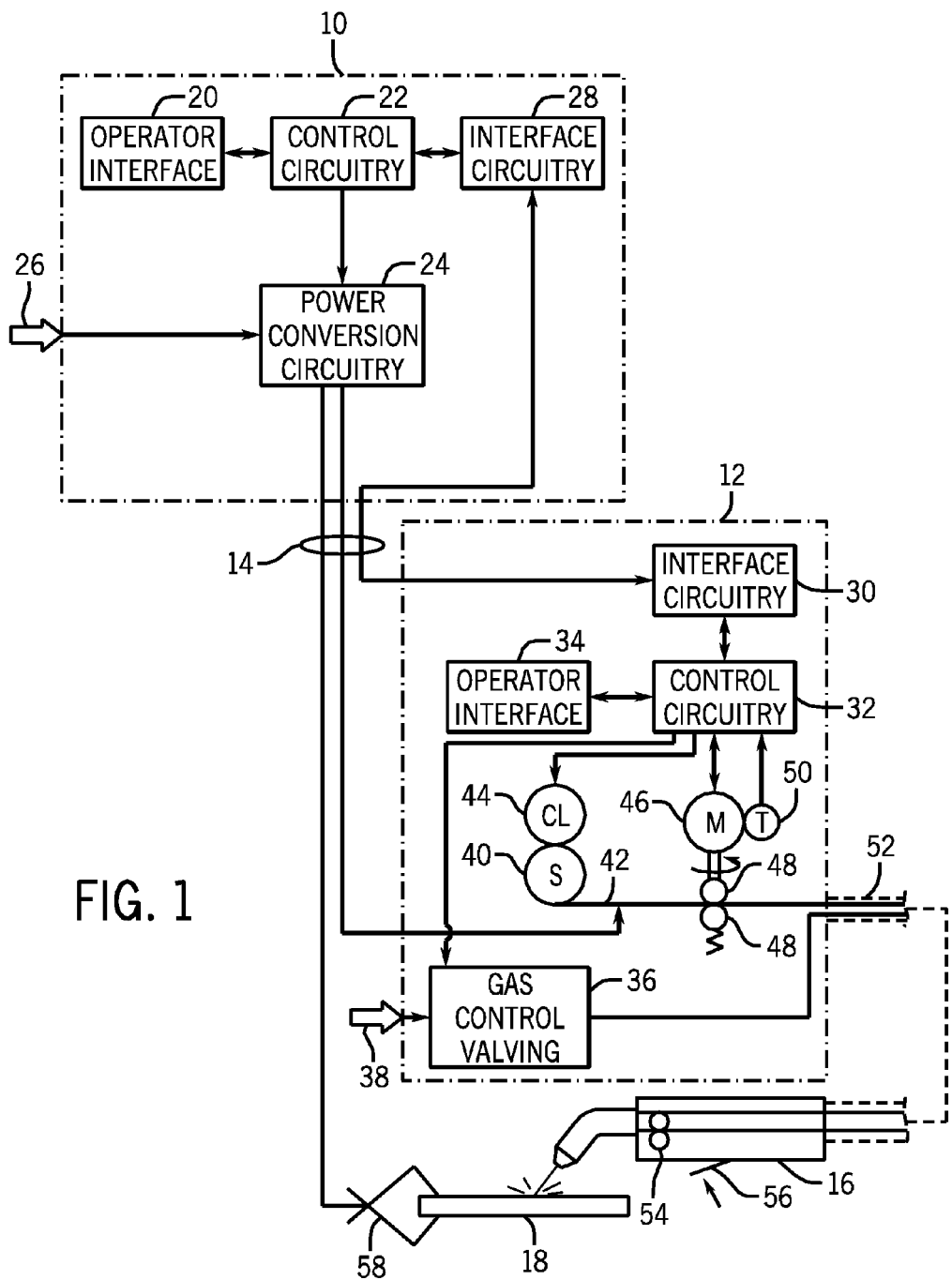
FIG. 1 is a diagrammatical representation of an exemplary MIG welding system illustrating a power supply coupled to a wire feeder for performing pulsed welding operations in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor is typically run to the welding workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with various steels, aluminums, or other welding wire that is channeled through the torch. These weld settings are communicated to control circuitry 22 within the power supply.

The control circuitry, described in greater detail below, operates to control generation of welding power output that is applied to the welding wire for carrying out the desired welding operation. In certain presently contemplated embodiments, for example, the control circuitry may be adapted to regulate a pulsed MIG welding regime, that may have aspects of short circuit transfer and of spray transfer of molten metal from the welding wire to a molten weld pool of a progressing weld. As described more fully below, such transfer modes may be controlled by altering operating parameters of current and voltage pulses for arcs developed between the welding wire and the weld pool, the workpieces, or all of these. Moreover, the pulsed welding techniques disclosed may be "hybrid" techniques that have characteristics of both short circuit regimes and spray regimes. In "short circuit" modes, droplets of molten material form on the welding wire under the influence of heating by the welding arc, and these are periodically transferred to the weld pool by contact or short circuits between the wire and droplets and the weld pool. In "spray" modes, molten material from the wire tip is periodically dispersed in a spray-like manner towards the weld pool. "Pulsed welding" or "pulsed MIG welding" refers to techniques in which a pulsed power waveform is generated, such as to control deposition of droplets of metal into the progressing weld pool. In a particular embodiment of the invention, a specialized pulsed welding regime may be implemented in which pulses are generated that have characteristics of both short circuit welding and spray welding, in a type of "hybrid" transfer mode.

The control circuitry is thus coupled to power conversion circuitry 24. This power conversion circuitry is adapted to create the output power, such as pulsed waveforms that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shielding gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch and thereby to the welding application, under the control of control circuitry 36. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 36, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire, typically by means of a welding cable 52 in a conventional manner. Similarly, shielding gas is fed through the wire feeder and the welding cable 52. During welding operations, the wire is advanced through the welding cable jacket towards the torch 16. Within the torch, an additional pull motor 54 may be provided with an associated drive roller, particularly for aluminum alloy welding wires. The motor 54 is regulated to provide the desired wire feed speed as described more fully below. A trigger switch 56 on the torch provides a signal that is fed back to the wire feeder and therefrom back to the power supply to enable the welding process to be started and stopped by the operator. That is, upon depression of the trigger switch, gas flow is begun, wire is advanced, power is applied to the welding cable 52 and through the torch to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in pulsed welding regimes, the wire feed speed may be altered periodically or cyclically.

Figure 2:
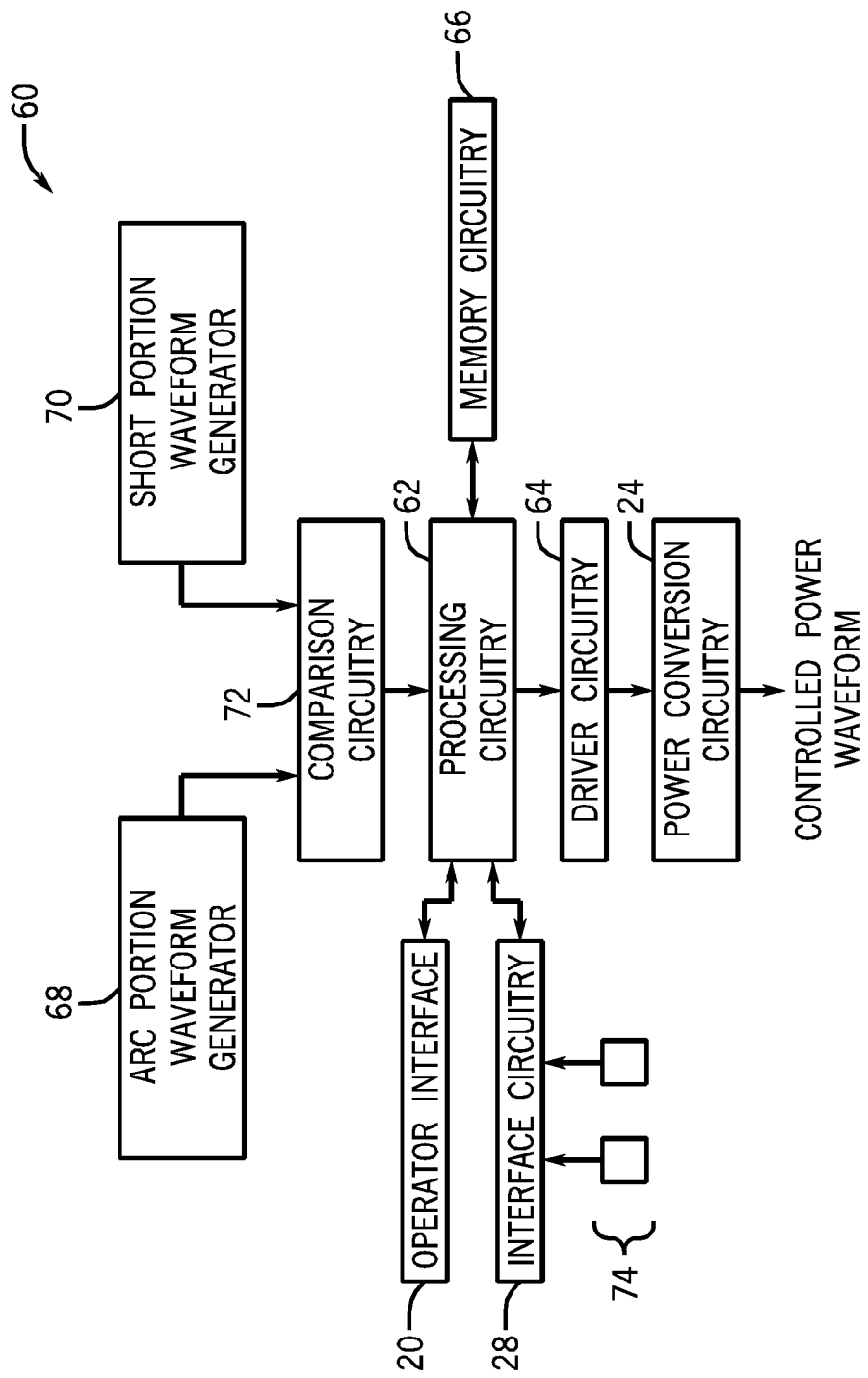
FIG. 2 is a diagrammatical representation of exemplary control circuitry components for a welding power supply of the type shown in FIG. 1.

FIG. 2 illustrates an exemplary embodiment for the control circuitry 22 designed to function in a system of the type illustrated in FIG. 1. The overall circuitry, designated here by reference numeral 60, includes the operator interface 20 discussed above and interface circuitry 28 for communication of parameters to and from downstream components such as a wirefeeder, a welding torch, and various sensors and/or actuators. The circuitry includes processing circuitry 62 which itself may comprise one or more application-specific or general purpose processors, designed to carry out welding regimes, make computations for waveforms implemented in welding regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for pulsed welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth.

As discussed above, the present pulse welding techniques allow for a "hybrid" approach that implements aspects of both short circuit transfer modes and spray transfer modes, and these may be adjusted or balanced to provide the desired welding characteristics. In the embodiment illustrated in FIG. 2, the scheme is implemented by two separate waveform generators, namely an arc portion waveform generator 68 and a short portion waveform generator 70. Each waveform generator cyclically produces currents that would be applied to a welding torch if the particular waveform generated were to be processed for controlling the driver circuitry 64. However, these two waveforms are, in practice, compared and processed such that the resulting waveform applied for welding is a combination of the waveforms produced by each generator. Accordingly, comparison circuitry 72 is illustrated that receives inputs from both waveform generators and produces a comparison output that is processed to create the control signals for the driver circuitry. Although illustrated separately in FIG. 2, it should be understood that the arc portion waveform generator, the short portion waveform generator and the comparison circuitry may be at least partially defined as code executed by the processing circuitry 62, such as codes stored in the memory circuitry 66. In other implementations, one or more of these components may comprise of firmware or hardware, at least in part. The waveforms generated by both waveform generators are the result of state machines that react to inputs. These inputs may include weld settings, pre-programmed logic, and inputs from sensors 74 received during the welding process. More complete descriptions of such state machines for welding is provided, for example, in U.S. Pat. No. 6,747,247, entitled Welding-Type Power Supply With A State-Based Controller, issued to Holverson et al. on Sep. 19, 2001; U.S. Pat. No. 7,002,103, entitled Welding-Type Power Supply With A State-Based Controller, issued to Holverson et al. on May 7, 2004; U.S. Pat. No. 7,307,240, entitled Welding-Type Power Supply With A State-Based Controller, issued to Holverson et al. on Feb. 3, 2006; and U.S. Pat. No. 6,670,579, entitled Welding-Type System With Network And Multiple Level Messaging Between Components, issued to Davidson et al. on Sep. 19, 2001, all of which are incorporated into the present disclosure by reference.

Figure 3:
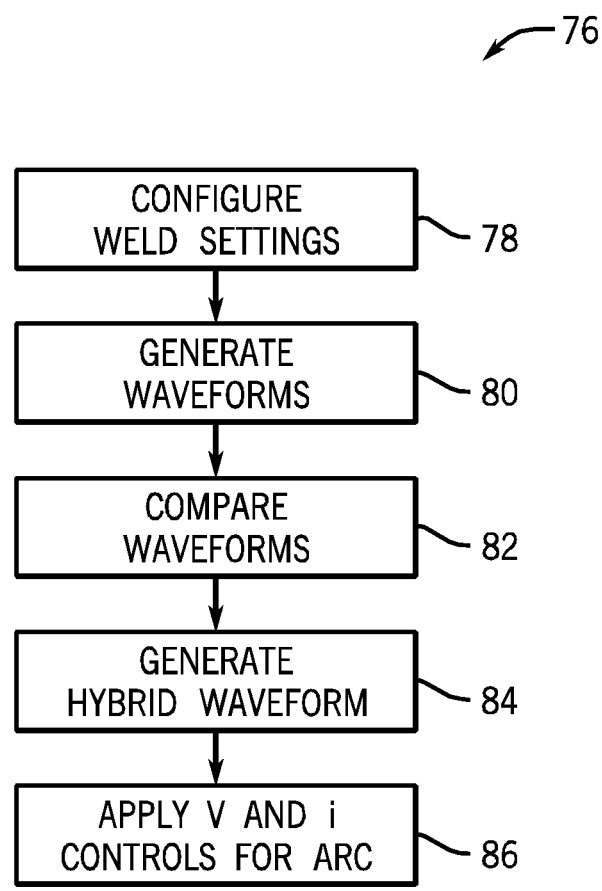
FIG. 3 is a flow chart illustrating exemplary steps in a combined or hybrid pulsed welding process.

FIG. 3 generally illustrates exemplary steps in carrying out a welding operation of the type disclosed. The process, designated generally by reference numeral 76, begins with configuration of the weld settings as indicated by reference numeral 78. This configuration may include, for example, selection of the hybrid welding process as opposed to other welding processes that may be pre-programmed or otherwise accessible on the welding system. The configuration may also include setting of voltage levels, current levels, wire types, and so forth. In certain embodiments, the configuration of the weld settings may further include adjustments that will allow for balancing between the short circuit mode of material transfer and the spray mode. As will be appreciated by those skilled in the art, the processes may be influenced, for example, by arc link that is controlled by an operator (or a robot in an automated setting). The balance towards the short circuit transfer mode may allow for a cooler process, while the balance towards the spray mode may allow for a hotter process with few or no short circuits. It is believed that the present approach to controlling the welding process allows for increased travel speed of the torch and weld pool creating the weld bead, but with enhanced capacity for filling gaps between the workpieces. The hybrid transfer modes and combined waveforms also allow for cooler and tighter arcs, which reduces spatter owing at least in part, to the techniques for clearing short circuits.

Following configuration of the weld settings, the welding process itself may begin. In the illustration of FIG. 3, this is initiated by generation of the waveform as indicated at step 80. These waveforms are then compared as noted above at step 82, and based upon the comparison a hybrid waveform is generated at step 84. As with other post welding approaches, these steps are carried on cyclically at a desired pulse rate, such as 20 Hz to 400 Hz (typically 100-200 Hz). For each pulse, then, the waveforms are generated at desired intervals, and the comparison results in control signals that are applied to the drive circuitry and to the power conversion circuitry to generate the desired voltages and currents as indicated at step 86. While any suitable control interval may be utilized, in presently contemplated embodiments, the intervals may range between 10 us (100 kHz) and 100 us (10 kHz).

Figure 4:
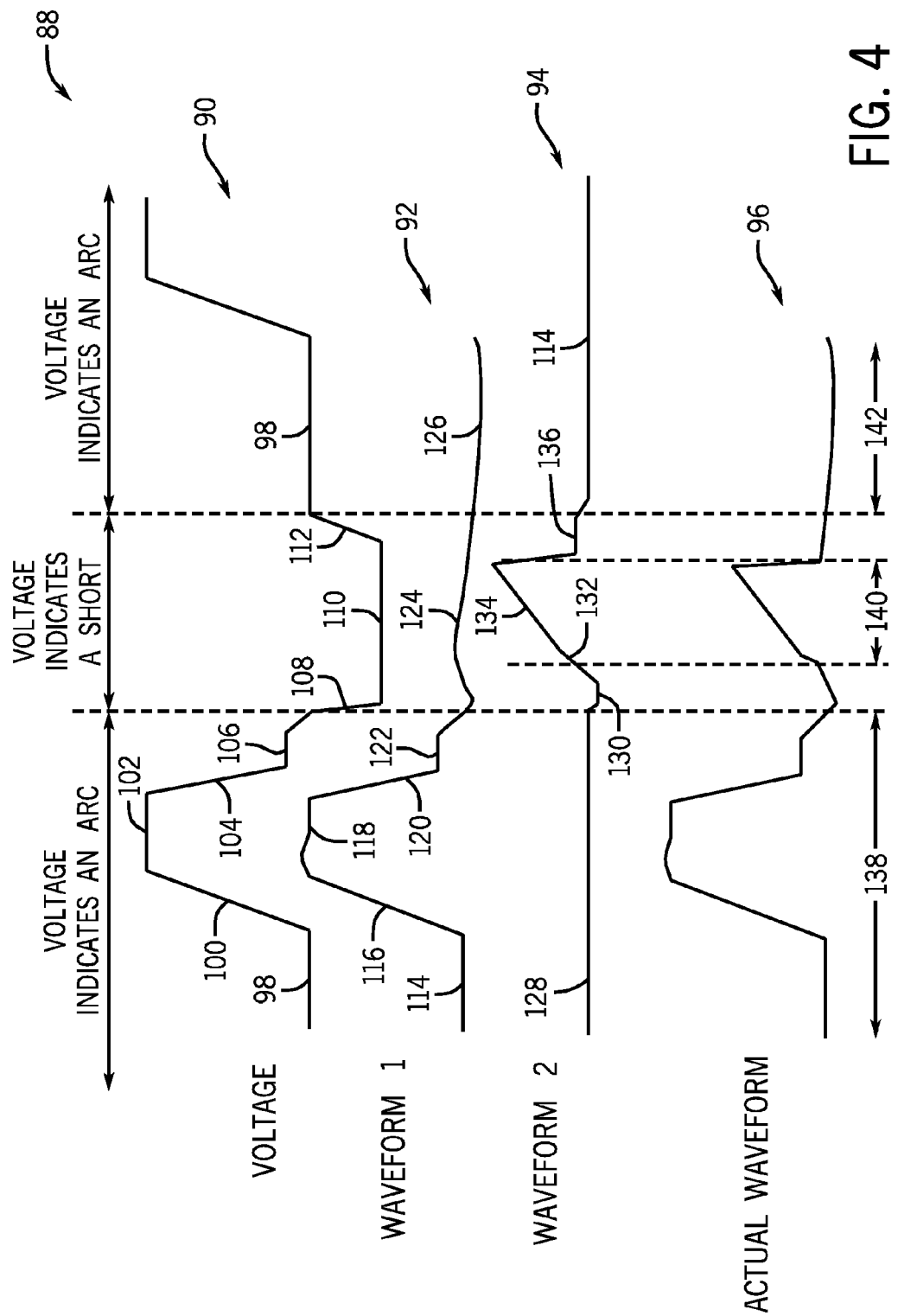
FIG. 4 is a set of voltage and current traces illustrating waveforms generated and applied for welding in accordance with a hybrid pulsed welding process.

FIG. 4 illustrates exemplary waveforms of the type that may be generated and applied in accordance with the present techniques. The set of waveforms, designated generally by reference numeral 88, include a voltage waveform 90, an arc-portion current waveform 92, a short-portion current waveform 94, and a combined or hybrid waveform 96. In the pulse process, the overall control scheme comprises a constant current pulse waveform generation process in a constant voltage control loop. The constant current process is the basis for the waveform, while the constant voltage loop is based upon measurement of voltage at a rapid rate (typically on the order of 50 us), and adjusts the current command to maintain a fixed voltage during peak and background periods. Typically, the constant voltage loop may disabled during ramps to and from background levels and peak levels. This process maintains good travel rates for the weld and good penetration.

The voltage waveform 90 which is maintained by the process may consist of a number of pre-determined or target voltage levels and ramps that may be defined by a state engine of the type described above. For example, in the illustrated embodiment, the voltage in each cyclic pulse is maintained at a background level in which current is controlled to maintain the desired voltage. This background voltage may be operator-settable. During the background phase of the voltage waveform, a ball of molten material is created at the end of the welding electrode. Following the background phase, a voltage ramp 100 is implemented, which may be performed by a closed-loop current process. The ramp rate may be set by internal parameters of the process or may be influenced by operator settings. Following the ramp, a voltage peak phase 102 is implemented, in general, this peak corresponds to pinching of the molten ball from the end of the electrode, and may be of a desired duration, which again may be internal to the process or operator setting-influence. Following the peak voltage, a declining ramp is implemented, here again by a closed loop current process. The ramp 104 declines to a knee 106. Following this knee, a short circuit is allowed to occur which causes the voltage to drop precipitously as indicated at reference numeral 108. Reference numeral 110, then, corresponds to a period in which the molten ball has created a short between the electrode and the weld pool. This short is cleared as indicated by reference numeral 110, allowing the voltage to again increase to the background level.

As described above, to generate the desired voltage waveform, the welding system generates two current waveforms as indicated by waveforms 92 and 94. Waveform 92 is generated by the arc portion waveform generator 68 illustrated in FIG. 2, while waveform 94 is generated by the short portion waveform generator 70 of FIG. 2. The arc portion waveform 92 includes a background current used to maintain the background voltage 98 of the voltage waveform, followed by a current ramp 116 that would be used to raise the voltage to the peak level 102. The ramp 116 may be performed in a current closed loop manner, followed by a peak current 118 which will vary somewhat owing to the maintenance of the peak in a constant voltage regime. That is, the waveform 92 will produce the current necessary to maintain the voltage at the peak 102. Following the current peak 118, a control ramp 120 brings the current down to a knee 122. Once the voltage enters into short circuit as described above, the current waveform 92 would attempt to exit the short circuit but in a relatively mild manner as indicated by section 124 of the trace. Following cleaning of the short, the waveform would return to a background as indicated by section 126 of the trace.

In parallel, the waveform 94 begins with a pre-short section 128 that is calculated at a low current level until a short circuit is detected. Thereafter, a "wet" segment is initiated as indicated by reference numeral 130. This segment of the waveform would allow for transfer of the molten ball into the wet weld pool, typically implemented by programmed timing. Following this wet section, a pinch phase is entered as indicated by reference numeral 132. This current increase would be intended to begin to pinch the ball from the electrode. Thereafter, a short clear section 134 is implemented with a steep rise in current until a short clear is imminent. The termination of the rise and current for the short clear may correspond to an actual measurement that voltage is rising. However, in a presently contemplated embodiment, a prediction technique is used as described in U.S. patent application Ser. No. 12/954,451, entitled Method and Apparatus For Welding With Short Clearing Prediction, filed by Davidson et al. on Nov. 12, 2010; and U.S. patent application Ser. No. 61/303,735, entitled Method and Apparatus For Welding With Short Clearing Prediction, filed by Davidson et al. on Feb. 12, 2010, which are incorporated into the present disclosure by reference. Following this short clear portion of the waveform, a steep drop in the current follows to a reduced level indicated by reference numeral 136, sometimes referred to as a "blink arc" phase. Thereafter, the current waveform 94 returns to the preshort level 128.

As described above, the present technique allows for comparison of waveforms 92 and 94 on a cyclical basis. The processing circuitry may then select the current that is higher between the two waveforms for any particular control interval. Waveform 96 in FIG. 4 illustrates the resulting hybrid waveform. During an arc phase 138, the arc-portion waveform 92 will typically dominate and the hybrid waveform will implement currents dictated by this arc-portion waveform. At some point, however, typically during the occurrence of the short circuit, the balance between the waveforms will be such that the short-portion waveform 94 will take over at least for clearance of the short circuit as indicated by reference numeral 140. Thereafter, the arc-portion waveform 92 will typically dominate as indicated by the segment 142 in FIG. 4.

As noted above, adjustments may be made to cause one of the two waveforms to be more or less dominant to alter the balance between the cooler short circuit process and the hotter spray transfer process. This may be accomplished, for example, by using coefficients or multipliers that may force one or the other waveform to be greater at least during certain portions of the pulse control. It is presently contemplated that in certain embodiments an adjustment may be offered for operator regulation of this balance. Alternatively, the balance may be altered by reference to such factors as wire feed speed wire type, voltages and currents set, welding position, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system comprising:
a first current waveform generator configured to generate a first current waveform for welding current for a first transfer mode;
a second current waveform generator configured to generate a second current waveform for welding current for a second transfer mode;
a comparison component configured to compare values of the first current waveform with the second current waveform;
processing circuitry configured to provide a control waveform based upon the comparison; and
power conversion circuitry configured to provide welding power output based upon the control waveform.
2. The system of claim 1, wherein the first current waveform comprises a pulsed waveform and the first transfer mode comprises a spray transfer mode.
3. The system of claim 2, wherein the pulsed waveform comprises a pulse rate of approximately 20 to 400 Hz.
4. The system of claim 3, wherein the pulsed waveform comprises a pulse rate of approximately 100 to 200 Hz.
5. The system of claim 2, wherein the second current waveform comprises a short-circuit clearing waveform, and the second transfer mode comprises a short-circuit transfer mode.
6. The system of claim 1, wherein the power conversion circuitry provides welding power output based upon which of the first and second current waveforms provides a greater current for a particular control interval.
7. The system of claim 6, wherein the control interval is between approximately 10 us (100 kHz) and 100 us (10 kHz).

8. The system of claim 1, comprising a user interface configured to allow user input for relative prioritizing of the comparison of the values of the first and second current waveforms.

9. A welding system comprising:
a first current waveform generator configured to generate a pulsed arc current waveform for welding current;
a second current waveform generator configured to generate a short-clearing current waveform for welding current;
a comparison component configured to compare values of the pulsed arc current waveform with values of the short-clearing current waveform;
processing circuitry configured to provide a control waveform based upon the comparison; and
power conversion circuitry configured to provide welding power output based upon the control waveform.

10. The system of claim 9, wherein the pulsed arc current waveform comprises a pulse rate of approximately 20 to 400 Hz.

11. The system of claim 10, wherein the pulsed arc current waveform comprises a pulse rate of approximately 100 to 200 Hz.

12. The system of claim 9, wherein the power conversion circuitry provides welding power output based upon which of the pulsed arc current waveform and the short-clearing current waveform provides a greater current for a particular control interval.

13. The system of claim 12, wherein the control interval is between approximately 10 us (100 kHz) and 100 us (10 kHz).

14. The system of claim 9, comprising a user interface configured to allow user input for relative prioritizing of the comparison of the values of the pulsed arc current waveform and the short-clearing current waveform.

15. A welding method comprising:
generating a first current waveform for welding current for a first transfer mode;
generating a second current waveform for welding current for a second transfer mode;
comparing values of the first current waveform with the second current waveform for control intervals and generating a control waveform based upon the comparison; and
converting incoming power to welding power based upon the control waveform.

16. The method of claim 15, wherein the first current waveform comprises a pulsed waveform and the first transfer mode comprises a spray transfer mode.

17. The method of claim 16, wherein the pulsed waveform comprises a pulse rate of approximately 20 to 400 Hz.

18. The method of claim 16, wherein the second current waveform comprises a short-circuit clearing waveform, and the second transfer mode comprises a short-circuit transfer mode.

19. The method of claim 15, comprising providing the welding power based upon which of the first and second current waveforms provides a greater current for a particular control interval.

20. The method of claim 19, wherein the control interval is between approximately 10 us (100 kHz) and 100 us (10 kHz).

21. A welding system comprising:
a regulated metal deposition process waveform separated into an arc portion and short-circuit portion continuously generated by separate current waveform generators during welding;
a comparison component configured to compare values of the arc with the short-circuit portions;
processing circuitry configured to provide a control waveform based upon the comparison; and
power conversion circuitry configured to provide welding power output based upon the control waveform.

22. A welding method comprising:
simultaneously generating an arc portion and a short-circuit portion of a regulated metal deposition process on a welding power supply;
applying welding power to a welding torch in accordance with the arc portion of the regulated metal deposition process; and
applying welding power to the welding torch in accordance with the short-circuit portion of the regulated metal deposition process during a short-circuit condition;
wherein an arc current waveform of the arc portion and a short-circuit current waveform of the short-circuit portion are combined for application of the welding power.

* * * * *